United States Patent
Damodar et al.

(10) Patent No.: US 9,430,515 B2
(45) Date of Patent: Aug. 30, 2016

(54) DATA VALIDATION USING SCHEMA DEFINITION

(71) Applicant: General Electric Company, Schenectady, NY (US)

(72) Inventors: Dhanashree Sadanand Damodar, Hyderabad (IN); Pradyumna Ojha, Hyderabad (IN); Christina Ann Romanik, Salem, VA (US); Veera Paparao Bolla, Hyderabad (IN); Balajose Goli, Hyderabad (IN)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 14/099,461

(22) Filed: Dec. 6, 2013

(65) Prior Publication Data
US 2015/0161193 A1 Jun. 11, 2015

(51) Int. Cl.
*G06F 17/30* (2006.01)

(52) U.S. Cl.
CPC ................ *G06F 17/30371* (2013.01)

(58) Field of Classification Search
None
See application file for complete search history.

(56) References Cited

U.S. PATENT DOCUMENTS

| | | | |
|---|---|---|---|
| 2002/0198908 A1 | 12/2002 | Hartel | |
| 2005/0097455 A1* | 5/2005 | Zhou | G06F 17/2705 715/234 |
| 2008/0201365 A1* | 8/2008 | Petri | G06F 17/2229 |

OTHER PUBLICATIONS

Stettner. Stackoverflow.com. Dec. 5, 2012.<https://web.archive.org/web/20121205075233/http://stackoverflow.com/questions/715626/validating-xml-nodes-not-the-entire-document>.*

* cited by examiner

*Primary Examiner* — Syed Hasan
(74) *Attorney, Agent, or Firm* — Fletcher Yoder, P.C.

(57) ABSTRACT

A system includes a first processor configured to intake a schema definition file. The schema definition file defines a set of rules that a data document must follow. The processor extracts one or more data adherence rules from the schema definition file and stores the extracted data adherence rules. Accordingly, subsequent data generation, configuration and/or validation of one or more system data objects may occur without requiring the creation of the data document.

20 Claims, 3 Drawing Sheets

DATA VALIDATION USING SCHEMA DEFINITION

BACKGROUND OF THE INVENTION

The subject matter disclosed herein relates to industrial process control systems, and more specifically, to data validation in industrial process control systems.

Industrial facilities, such as power generation plants, may include various interrelated equipment and process field devices. For example, power generation plants may include turbine or generator systems, and processes for operating and maintaining the turbine or generator systems. Certain industrial control systems may include a human-machine interface (HMI) system or other software application, in which data may be generated, processed, and/or transferred. To insure data integrity and/or proper functionality, data constraints may exist, which provide particular limitations on data. Traditionally, these limitations have been provided in a schema definition for the data, such as an extensible markup language (XML) schema definition (XSD) file. However, the use of an XML schema definition has traditionally merely constrained XML. Thus, in traditional approaches, XML files have been generated to validate the data. Unfortunately, in some cases, XML generation may be processor intense, creating an undue processing burden on components of the industrial process control system. Accordingly, it would be beneficial to improve configuration, generation, and/or data validation of software-modeled components, systems and/or frameworks in the industrial process control system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a first processor configured to intake a schema definition file. The schema definition file defines a set of rules that a data document must follow. The processor extracts one or more data adherence rules from the schema definition file and stores the extracted data adherence rules. Accordingly, subsequent data validation of one or more system data objects may occur without requiring the creation of the data document.

In a second embodiment, a system includes a processor that accesses one or more data adherence rules. The data adherence rules are extracted from a schema definition file defining rules that a data document must follow. The processor accesses one or more system data objects and validates the one or more system data objects against the accessed data adherence rules without creating the data document.

In a third embodiment, an industrial control system includes a data storage. The system also includes one or more schema definition files that define a set of rules that a data document must follow. The system includes a schema file reader and processor device that extracts one or more data adherence rules from the one or more schema definition files and stores the one or more data adherence rules in the data storage. A decision control system of the industrial control system accesses system object data and at least a portion of the one or more data adherence rules from the data storage. The decision control system validates the system object data against the at least portion of the one or more data adherence rules without generating the data document.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to methods and systems of configuring, generating, and/or validating data against rules defined in an XML Schema definition (XSD) file. In contrast to systems where XSD files are used to validate data stored in XML files, the current approach uses the rule extraction techniques described herein to extract rules that may be utilized by non-XML based data. This may result in increased efficiency and reduced data processing within the industrial process control system.

Figure 1:
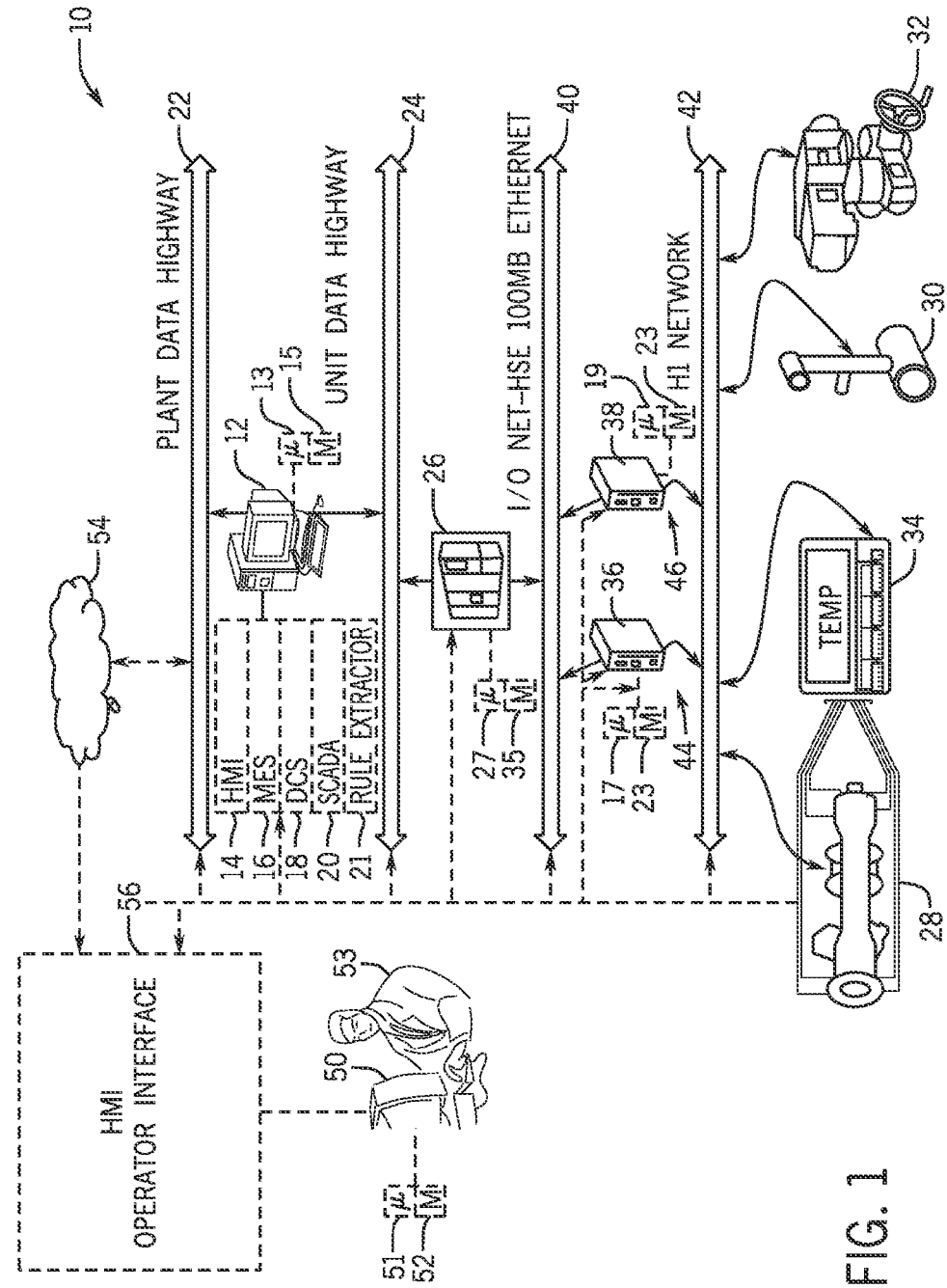
FIG. 1 is a block diagram of an embodiment of an industrial process control system using extracted rules from an extensible markup language (XML) schema definition (XSD) file, in accordance with an embodiment.

With the foregoing mind, it may be useful to describe an embodiment of an industrial process control system 10 as depicted in FIG. 1. The control system 10 may include a computer 12 suitable for executing a variety of field device configuration and commissioning applications, and for providing an operator interface through which an engineer or technician may monitor the devices of the control system 10. Accordingly, the computer 12 may include a processor 13 that may be used in processing computer instructions, and a memory 15 that may be used to store computer instructions and other data. These instructions may be encoded in programs stored in tangible non-transitory computer-readable medium such as the memory 15 or other storage. The computer 12 may include any type of computing device suitable for supporting software applications, such as a laptop, a workstation, a tablet computer, or a handheld portable device (e.g., personal digital assistant or cell phone). Indeed, the computer 12 may include any of a variety of hardware and/or operating system platforms.

In accordance with one embodiment, the computer 12 may host an industrial control software, such as a human-machine interface (HMI) (e.g., combined software and hardware system) 14, a manufacturing execution system (MES) 16, a distributed control system (DCS) 18, and/or a supervisor control and data acquisition (SCADA) system 20. Additionally, the computer 12 may include an XSD rule extraction and consolidation module 21, which may enable rules defined in an XSD file to be used in validation of non-XML based data. The HMI 14, MES 16, DCS 18, and/or SCADA 20 may include executable code instructions stored on non-transitory tangible computer readable media, such as the memory 15 of the computer system 12. For example, computer 12 may support ControlST™ and/or ToolboxST™ software, available from General Electric Co., of Schenectady, N.Y.

Further, the computer 12 may be communicatively connected to a plant data highway 22 which may allow for enabling communication between the depicted computer 12 and other computers in the plant. Indeed, the industrial control system 10 may include multiple computer systems interconnected through the plant data highway 22. The computer 12 may be further communicatively connected to a unit data highway 24, which may couple the computer 12 to an industrial controller 26. The industrial controller 26 may include a processor 27 and a memory 35 suitable for executing and storing computer instructions and/or control logic useful in automating a variety of plant equipment, such as a turbine system 28, a valve 30, a pump 32, and a temperature sensor 34. The turbine system 28 may include a gas turbine, a steam turbine, a wind turbine, a hyrdroturbine, or any combination thereof. Other plant equipment may include flow meters, vibration sensors, clearance sensors, gas composite sensors, pressure transmitters, level transmitters, actuators, relays, reactors, compressors, and so forth.

As depicted, the turbine system 28, the valve 30, the pump 32, and the temperature sensor 34 are communicatively coupled to the industrial controller 26 by using linking devices 36 and 38 suitable for interfacing between an I/O network 40 and an H1 network 42. As depicted, the linking devices 36 and 38 may include processors 17 and 19, respectively, useful in executing computer instructions, and may also include memory 23 and 25, useful in storing computer instructions and other data. In certain embodiments, the I/O network 40 may be a 100 Megabit (MB) high speed Ethernet (HSE) network, and the H1 network 42 may be a 31.25 kilobit/second network. Accordingly, data transmitted and received through the I/O network 40 may in turn be transmitted and received by the H1 network 42. That is, the linking devices 36 and 38 may act as bridges between the I/O network 40 and the H1 network 42. For example, higher speed data on the I/O network 40 may be buffered, and then transmitted at suitable speed on the H1 network 42. Accordingly, a variety of field devices may be linked to the industrial controller 26 and to the computer 12.

Each of the linking devices 36 and 38 may include one or more segment ports 44 and 46 useful in segmenting the H1 network 42. For example, the linking device 36 may use the segment port 44 to communicatively couple with the device 28 and 34, while the linking device 38 may use the segment port 36 to communicatively couple with the devices 30 and 32. Distributing the input/output between the devices 28, 30, 32, and 34, by using, for example, the segment ports 44 and 46 may enable a physical separation useful in maintaining fault tolerance, redundancy, and improving communications time.

In certain embodiments, the HMI 14 may be executable by computer 50 (e.g., including processor 51 and memory 52), which may be used by an operator 53 to interface with the industrial control system 10 via an HMI operator interface 56. Accordingly, the computer 50 may include various input and output devices (e.g., mouse, keyboard, monitor, touch screen, printer, eye-tracking display, or other suitable input or output device) such that the operator 53 may provide commands (e.g., control and/or operational commands) to the industrial control system 10 and receive reports from the industrial control system 10. Furthermore, in certain embodiments, the computer 50 may be communicatively coupled to the computer system 12 (e.g., the HMI 14) through direct or indirect techniques in order to receive information regarding the operation of the HMI 14. For example, a signal conduit (e.g., cable, wireless router) may be used to directly couple the computer 50 to the computer 12. Likewise, a file transfer mechanism (e.g., remote desktop protocol (RDP), file transfer protocol (FTP), manual transfer, or other suitable mechanism) may be used to indirectly send or to receive data (e.g., files, firmware, updates). Further, cloud 54 computing techniques may be used, in which all or part of the HMI 14 resides in the cloud 54 and communicates directly or indirectly with the computer system 12 (e.g., via a network or the Internet).

Figure 2:
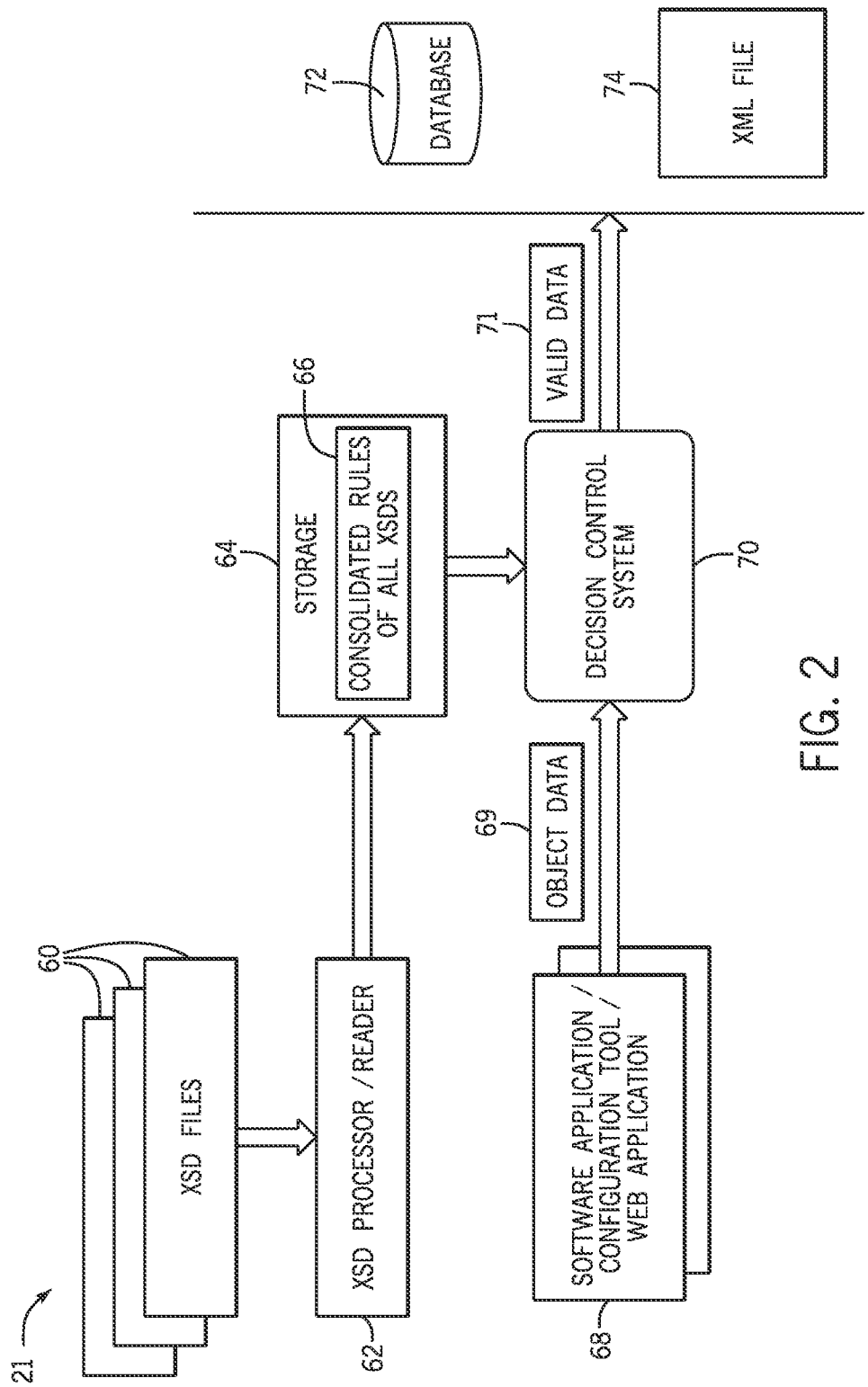
FIG. 2 is a block diagram of an embodiment of an XSD rule extraction system, in accordance with an embodiment.

FIG. 2 is a block diagram illustrating the rule extraction and consolidation module 21, in accordance with an embodiment. As mentioned above, the rule extraction and consolidation module 21 may receive as an input one or more XML schema definition (XSD) files 60 that may define parameter and/or syntax constraints on one or more XML documents and other data. In other words, the XSD files 60 may express a set of rules to which an XML document and other data should conform in order to be considered valid.

For example, the XSD files 60 may include a definition of: particular elements and/or attributes related to particular elements that may exist in a data set, definition of attributes, a particular ordering of elements within a data set, a number of allowable elements within a data set, relationships between elements (e.g., a parent/child relationship), default value and/or fixed values for elements and/or attributes, data types for elements and/or attributes, etc. The XSD files 60 may constrain data to a particular data type, such as a string, decimal, integer, Boolean, date, time, and/or user-defined data type. Further, default and/or fixed values may be defined by an XSD file 60. Additionally, the XSD files 60 may define whether or not attributes and/or elements are optional or required. The XSD files 60 may also define value restrictions such as minimum values, maximum values, enumerated value options, and pattern constraints (e.g., all lowercase letters, all uppercase letters, five numerals, one value from a subset of values, etc.).

Indeed, the XSD files 60 may define any number of structural rules for data. For example, the XSD files may define one or more simple elements and/or one or more complex elements defining features, characteristics, and/or parameters of the industrial process control system 10. Simple elements may be defined as formed data that includes one piece of information of a particular type. For instance, the simple element may constrain data to a particular type included in the XML Schema definition (e.g., Boolean, string, date, time, etc.) or could be a custom type defined by the XML/XSD creator. Complex elements may be defined as formed data that is empty and/or contains elements and/or attributes. For example, a complex element may be empty, in which case no data type is defined for the complex element. Alternatively, the complex element may include other elements, such as one or more simple elements. Further, these complex elements may include associated attributes. Attributes define certain features and/or characteristics of the data. The attributes may define fixed attribute values (e.g., non-changing) and/or default attribute values (e.g., attributes that are a certain value when no value is specified). Further, the attributes may restrict attribute values to particular data types (e.g., a string, integer, date, etc.) and particular ranges (e.g., a number between 10-20), patterns (e.g., three uppercase letters), and/or threshold values (e.g., lower than 100 and/or greater than 0).

In some embodiments, the XSD files 60 may be useful for generating components represented by data in one or more of the computers of the industrial process control system 10. For example, components, sub-systems, and/or a framework for the components and/or sub-systems of the industrial process control system 10 may be modeled and/or configured in the HMI 14. The XSD files 60 may include rules defining the parameters for generating and/or configuring such components and/or sub-systems. For example, an XSD file 60 providing pre-defined rules describing a plant containing 2 gas turbines and a single steam turbine may be used to generate such a plant representation in the HMI 14. Accordingly, the XSD file 60 constraints may be used to automatically generate and configure the components, sub-systems, and/or a framework for the components and/or sub-systems of the industrial process control system 10.

The XSD files 60 of the rule extraction and consolidation module 21 may be consumed by an XSD processor and/or reader 62. For example, the XSD processor and/or reader may receive the XSD files 60 as input and may extract data adherence rules from the XSD files 60. The example, the rules may be interpreted from elements and/or attributes of the XSD files 60. In certain embodiments, the XSD processor and/or reader 62 may read the attributes and elements of the XSD files 60 to determine rules in which incoming data generated in the system 10 should adhere to. For example, the rules may include data type adherence, such as defining certain sensor data to be of the integer type. Accordingly, if the certain sensor data received was a date or time, a type-mismatch error would occur and the data would be flagged/noticed as invalid.

The data adherence rules may also include value restriction rules. For example, the data adherence rules interpreted from the XSD files 60 may include range rules that may require, for example, an integer to be between a minimum and a maximum value. For example, the range rule may define that a particular piece of integer data to fall within the range of 0 and 1. The range rules may also apply to other data types, such as alphanumeric text and/or real numbers.

The value restriction rules may also include a restriction of a series of values. For example, the XSD files 60 may define a pattern of values, such as providing pattern adherence defining a certain number of values and/or particular value patterns for each of the values in that certain number of values. For instance, the XSD files 60 may define a pattern restriction rules such as "[a-zA-Z][a-z]-[a-z]," which may be interpreted by the XSD processor and/or reader 62 as a pattern defined by three characters, where the first character may be upper or lower case and the additional characters must be lower case. The pattern restriction rules may also be used to provide a choice between multiple data values. For example, the pattern restriction may be defined as [xyz], which may be interpreted by the XSD processor/reader 62 as a pattern restriction rule suggesting that the data should conform to a choice of either x or y or z. Pattern repetition may also be interpreted by the XSD processor and/or reader 62. For example, when a pattern is provided with an "*" (e.g., ([pattern]*)), the pattern may be interpreted as allowing the data to adhere to zero or more iterations of the pattern. Accordingly, data that repeats zero or more times will be valid. When a pattern is provided with a "+" (e.g., ([pattern])+)), the XSD processor and/or reader 62 may interpret a pattern restriction rule suggesting that one or more instances of the pattern be present in the data.

Certain data type values may be restricted based upon specific tools provided in the XSD nomenclature. For example, the table below provides specific attributes that may be used to limit particular data type values.

TABLE 1

| | |
|---|---|
| Enumeration | Defines a list of acceptable values |
| fractionDigits | Specifies the maximum number of decimal places allowed. |
| length | Specifies an exact number of characters or list items allowed |
| minInclusive | Specifies the lower bounds for numeric values (value >= minInclusive) |
| maxInclusive | Specifies the upper bounds for numeric values (value <= maxInclusive) |
| minExclusive | Specifies the lower bounds for numeric values (value > minExclusive) |
| maxExclusive | Specifies the upper bounds for numeric values (value < maxExclusive) |
| minLength | Specifies the minimum number of characters or list items allowed |
| pattern | Defines the exact sequence of character that are acceptable |
| totalDigits | Specifies the exact number of digitals allowed |
| whiteSpace | Specifies how white spaces are handled (e.g., tab, line feed, etc.) |

The above-described XSD file 60 interpretation by the XSD processor and/or reader 62 is provided for illustrated purposes only. The discussion is not meant to be an exhaustive list of every type of rule that may be interpreted by the XSD processor and/or reader 62. Indeed, there are many other rules that may be defined using the XSD nomenclature. Accordingly, the XSD processor and/or reader 62 is not intended to be limited by this discussion.

Once the data adherence rules are determined, the XSD processor and/or reader 62 stores the rules in storage 64. Because there may be multiple XSD files 60, multiple rules may be provided. Accordingly, the XSD processor and/or reader 62 may consolidate rules of all of the XSD files 60 in the storage 64. For example, the XSD processor and/or reader 62 may store non-conflicting rules without alteration, but, in some instances, may alter one or more rules based upon conflicts. For example, if two rules provide different ranges for the same data element, the XSD processor and/or reader 62 may either prompt a user for guidance as to which rule should be followed. In some embodiments, the XSD processor and/or reader 62 may be configured to automatically select the proper rule or to merge rules, either by taking the most restrictive, least restrictive, or merging the least restrictive or most restrictive rules between each of the determined data adhere rules. For example, if a first data adherence rule stated that sensor output 1 should be in the range of 15 to 40 and a second data adherence rule stated that sensor output 1 should be in the range of 16 to 39, the XSD processor and/or reader 62 may be setup to prompt a user for the correct adherence rule to use. In embodiments where the XSD processor and/or reader 62 is configured to automatically select a rule, the XSD processor and/or reader 62 may select the least restrictive (e.g., the wider range rule, here the first data adherence rule) or the most restrictive rule (e.g., the narrowest range rule, here the second data adherence rule in our example). In some embodiments, the XSD processor and/or reader 62 may create a merged rule, such as creating a new range limitation of between 15 to 39 or between 16 to 40, depending on the configuration of the XSD processor and/or reader 62.

Having now discussed the data adherence rule extraction, the discussion now turns to data objects within the system 10 and their creation, configuration, and/or validation using the data adherence rules. A software application, configuration tool, and/or web application 68 of the system 10 may access, reference, generate, and/or modify object data 69 in the system 10. For example, as mentioned above, a web-based human machine interface (HMI) of the system 10 may utilize object data relating to one or more devices, such as the field devices or other equipment discussed in FIG. 1. In one example, a gauge of the system 10 may be represented in the HMI or other software application, configuration tool, and/or web application 68. The object data relating to the gauge may include, for example, an identifier that identifies the gauge and one or more parameters associated with the gauge. For example, one parameter may include a unit of measure attribute. If the gauge is measuring pressure, for example, the units may be: pascals (pa), bars (bar), technical atmosphere (at), standard atmosphere (atm), torrs (torr), or pounds per square inch (psi). Further, the object data may include one or more attributes defining minimum measurements, maximum measurements, actual measurements, or any other operating attribute. The object data relating to the gauge may be generated, configured, and/or validated using the data adherence rules extracted from the XSD files 60.

For example, from time to time, the object data 69 flowing from the software application, configuration tool, and/or web application 68 may be validated to ensure that proper handling of the object data 69 by the applications 68. In contrast to systems that generate extensible markup language (XML) pages with the incorporated object data to be validated against the XSD files 60, the current system does not require the generation of XML pages. Because the XSD processor and/or reader 62 interprets the XSD files 60 and creates the consolidated rules 66, the object data 69 may be fed to a decision control system 70, which may access the consolidated rules 66 and verify the object data 69 directly, without placing the object data 69 within an XML file. Such direct verification by the decision control system 70 may increase system 10 performance as well as reduce certain data complexities and/or timing constraints of the system 10. For example, the object data 69 in the system 10 may be quite large. Generating XML files for such object data 69 may be quite processor intensive and/or time intensive. Accordingly, the functionalities of the system 10 may be enhanced by enabling direct validation without the need to generate certain XML files.

Once the object data 69 has been validated, the valid data 71 may flow to downstream processes. For example, the valid data 71 may be stored in a database 72 for access by other components of the system 10 and/or may be converted into XML files 74 for further processing. Further, in certain embodiments, if the data is invalid, the data may be sent back to the software application, configuration tool and/or web application 68. In some embodiments, one or more notifications regarding invalid data may be sent to a display, speakers, or other output device associated with the software application, configuration tool, and/or web application 68.

Figure 3:
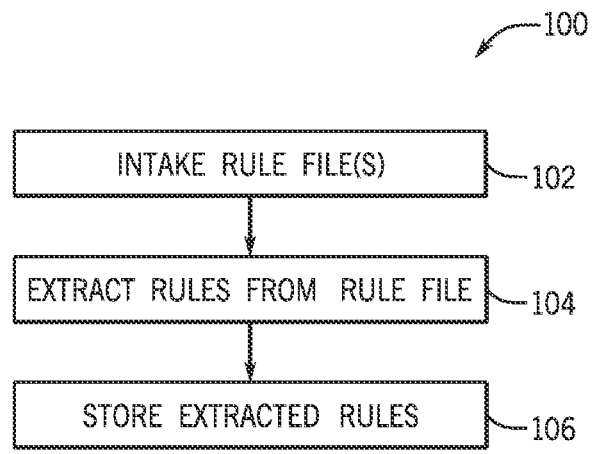
FIG. 3 is a flowchart illustrating an embodiment of a process for extracting and consolidating rules from an XSD file, in accordance with an embodiment.

Turning now to FIG. 3, a flow diagram is presented, illustrating an embodiment of a process 100 useful in extracting XSD rules in an industrial system, such as a power plan, turbine system (e.g., gas, steam, wind, and/or hydroturbine), compression system, reactor (e.g., gasifier), or any combination thereof. The process 100 may include code or instructions stored in a non-transitory machine-readable medium (e.g., a memory 52) and executed, for example, by one or more processors (e.g., processor 51). The process 100 may be executed by the XSD processor and/or reader 62 of FIG. 2, which may reside on a computer system that executes additional functionalities such as those of the decision control system 70 of FIG. 2. The process 100 begins with in taking the rule files (e.g., the XSD files 60 of FIG. 2) (block 102). For example, the rule files may be stored in memory of the XSD processor and/or reader. Next, rules may be extracted from the rule files (block 104). For example, as discussed above, the elements, attributes, and/or restrictions may be read from the XSD files 60 to determine a set of adherence rules for the data, such as data type, data content restrictions, etc. The adherence rules are then consolidated and stored (block 106). For example, as described above, the rules may be stored in a database such that system processes may access the data adherence rules.

Figure 4:
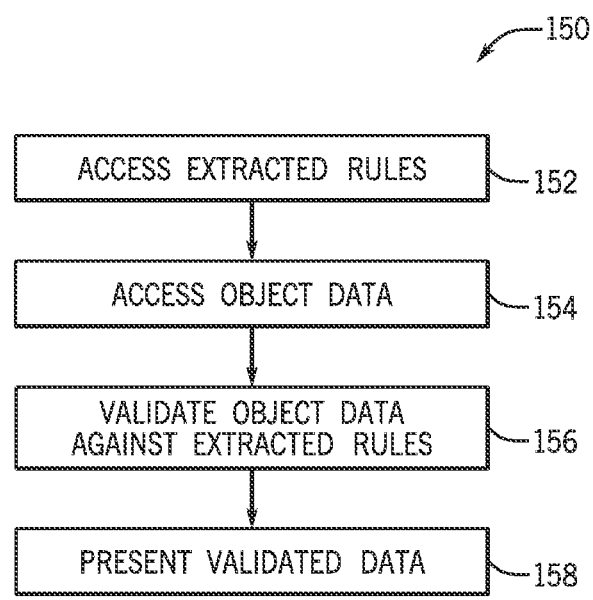
FIG. 4 is a flowchart illustrating an embodiment of a process for validating data against extracted and consolidated XSD file rules, in accordance with an embodiment.

FIG. 4 is a flow diagram illustrating an embodiment of a process 150 for validating non-XML based data using extracted XSD rules. For example, a processor running an industrial automation application may use the process 150 to validate its data. The process 150 may include code or instructions stored in a non-transitory machine-readable medium (e.g., a memory 52) and executed, for example, by one or more processors (e.g., processor 51). The process 150 begins by accessing the extracted rules (block 152). For example, as discussed above, the rules may be stored in a database, computer memory, or any other data repository, where the rules may be retrieved. The object data to be verified (e.g., data provided by an industrial control application) is also accessed (block 154). In some embodiments, only the relevant rules may be accessed, as determined by the accessed object data. For example, in certain embodiments, the rules are queried for relevancy with the particular object data. Accordingly, only the relevant rules are obtained for subsequent verification. Once the relevant rules are obtained, the object data is generated, configured, and/or validated using the relevant rules (block 156). Lastly, the data is presented as an output (e.g., for further processing or display) (block 158). In some embodiments, when the data is not valid, a notification may be sent to the entity providing the data. For example, an invalid data acknowledgement may be provided to a software application, configuration tool, and/or web application that provided the invalid data.

Technical effects of the present embodiments relate to methods and systems of generating, configuring, and/or verifying non-XML based data using rules extracted from an XML schema definition (XSD). By enabling non-XML based data to be validated based upon one or more XSD files, processing power may be conserved. For example, particular object data may be validated without an additional processing step of generating XML representative of the object data. This conservation may greatly improve the efficiencies of the industrial control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial control system, comprising:
a first hardware-based processor configured to:
intake a processor-readable schema definition file configured to define a set of rules for a data document to follow;
generate one or more data adherence rules, the data adherence rules comprising a set of rules for non-data document data, by:
extracting attributes, elements, or both from the schema definition file; and
determining the one or more data adherence rules using the extracted attributes, elements, or both; and
store the one or more data adherence rules to enable subsquent data validation, data generation, data configuration, or a combination thereof, of one or more system data objects, the subsequent data validation being based upon data of the one or more system data objects without validating against any portion of the data document, wherein the data objects relate to one or more components of the industrial control system.

2. The system of claim 1, wherein the data document comprises an extensible markup language (XML) data file.

3. The system of claim 1, wherein the schema definition file comprises an XML schema definition (XSD) file.

4. The system of claim 3, wherein the first processor is configured to extract the one or more data adherence rules from the XSD based at least in part upon simple elements, complex elements, or both found in the XSD file.

5. The system of claim 3, wherein the first processor is configured to extract the one or more data adherence rules from the XSD based at least in part upon attributes found in the XSD file.

6. The system of claim 3, wherein the first processor is configured to extract the one or more data adherence rules from the XSD based at least in part upon value restrictions, a restriction of a series of values, or a cominbation thereof, found in the XSD file.

7. The system of claim 1, comprising a decision control system, wherein the decision control system comprises a second processor configured to:
access the one or more data adherence rules,
receive the one or more system data objects, and
validate the one or more system data objects against the one or more data adherence rules.

8. The system of claim 7, wherein the first processor and the second processor are the same processor.

9. The system of claim 1, wherein the first processor is configured to store the one or more data adherence rules in a database.

10. A system, comprising a processor configured to:
access one or more data adherence rules, wherein the data adherence rules are generated from attributes, elements, or both extracted from a schema definition file defining rules for a data document to follow and wherein the data adherence rules comprise a set of rules for non-data document data;
access one or more system data objects; and
validate, generate, configure, or a combination thereof, the one or more system data objects against the one or more system data adherence rules to determine if the one or more system data objects are valid data objects or invalid data objects, without validating against any portion of the data document.

11. The system of claim 10, wherein the processor is configured to:
when the one or more more system data objects are valid, present the valid system data objects to downstream processes, and
when the one or more system data objects are invalid, present a notification to a system component providing the invalid system data objects.

12. The system of claim 10, wherein the data document comprises an extensible markup language (XML) data file and the schema definition file comprises an XML, schema definition (XSD) file.

13. The system of claim 12, wherein the system comprises an industrial control system and the processor is configured to access the one or more system data objects from a software application, a configuration tool, a web application, or a combination thereof, of the industrial control system.

14. The system of claim 10, wherein the processor is configured to access only a subset of the one or more data adherence rules associated with the one or more system data objects.

15. An industrial control system, comprising:
a data storage;
one or more schema definition files configured to define a set of rules for a data document to follow;
a schema file reader and processor device configured to:
generate one or more data adherence rules using attributes, elements, or both extracted from the one or more schema definition files, the data adherence rules comprising a set of rules for non-data document data; and
store the one or more data adherence rules in the data storage;
a decision control system configured to:
access system object data;
access at least a portion of the one or more data adherence rules from the data storage; and
validate, generate, configure, or a combination thereof, the system object data against the at least portion of the one or more data adherence rules without validating against any portion of the data document.

16. The industrial control system of claim 15, comprising a computer having at least one of: a software application, a configuration tool, or a web application, wherein the decision control system is configured to access the system object data from the computer.

17. The industrial control system of claim 15, wherein the data document comprises an extensible markup language (XML) data file.

18. The industrial control system of claim 15, wherein the schema definition file comprises an XML schema definition (XSD) file.

19. The industrial control system of claim 15, wherein the schema file reader is configured to alter one or more conflicting data adherence rules based upon detecting a conflict in the one or more data adherence rules.

20. The industrial control system of claim 19, wherein the schema file reader is configured to:
- alter the one or more conflicting data adherence rules based upon a user input prompt entry, when the schema file reader is configured to provide a user prompt upon detecting the conflict in the one or more data adherence rules;
- alter the one or more conflicting data adherence rules to a least restrictive data adherence rule, when the schema file reader is configured to automatically provide the least restrictive data adherence rule; and
- alter the one or more conflicting data adherence rules to a most restrictive data adherence rule, when the schema file reader is selectively configured to automatically provide the most restrictive data adherence rule.

* * * * *